Dec. 31, 1963

G. LOOSER 3,116,194

MOVABLE EXTRUDER

Filed Nov. 17, 1958

INVENTOR.
GOTTLIEB LOOSER
BY MICHAEL S. STRIKER
ATTORNEY

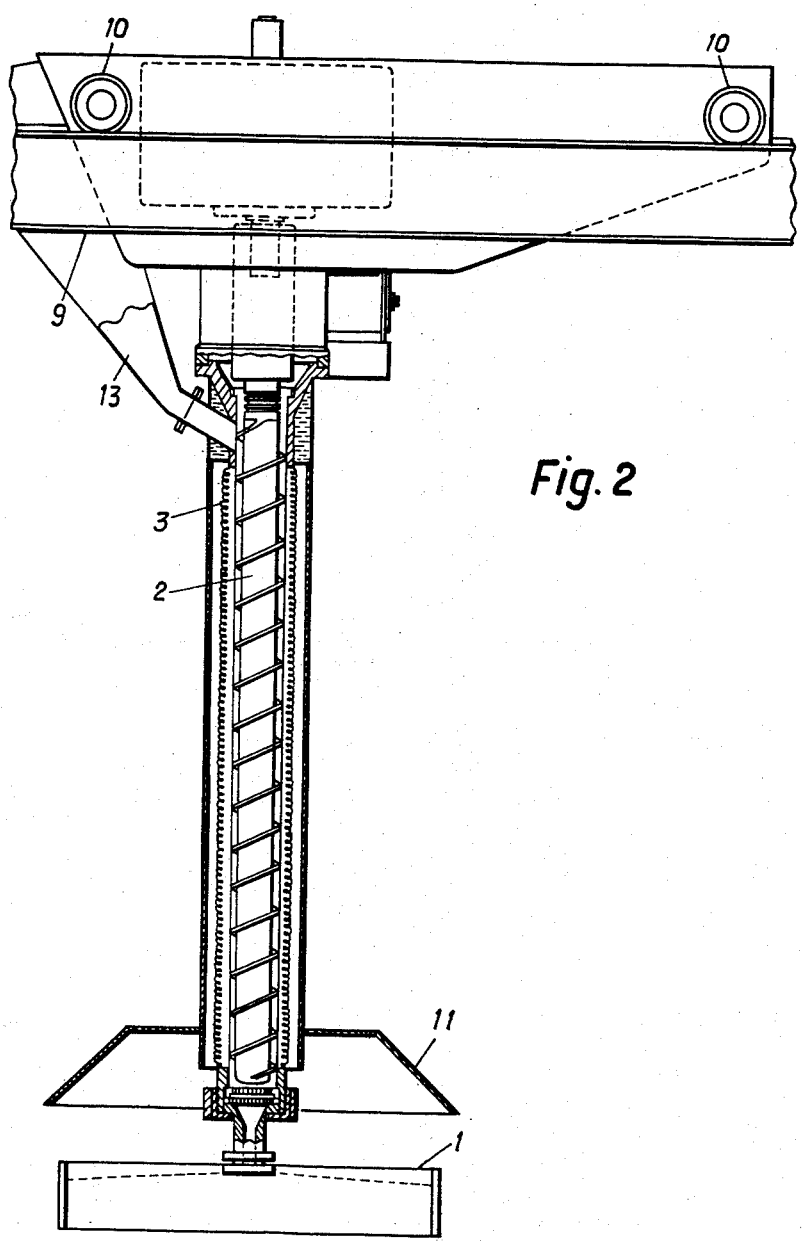

United States Patent Office — 3,116,194 — Patented Dec. 31, 1963

3,116,194
MOVABLE EXTRUDER
Gottlieb Looser, Zurich, Switzerland, assignor to Verwaltungsgesellschaft der Werkzeugmaschinenfabrik Oerlikon, Zurich-Oerlikon, Switzerland, a company of Switzerland
Filed Nov. 17, 1958, Ser. No. 774,203
Claims priority, application Switzerland Nov. 18, 1957
2 Claims. (Cl. 156—500)

This invention relates to a device for coating band-like material with a layer of plastic.

It is a first object of this invention to permit the coating device to be accommodated on a much smaller floor area than that required by known devices, and greatly to improve access to the individual parts of the unit.

It is a further object of this invention to permit the extrusion press to be moved clear of the application area in a direction crosswise of the running web, and thus to facilitate adjusting, checking and cleaning operations.

It is a still further object of this invention to permit the injection head to be moved up near to the application area, and thus to improve the bonding action between the band material and the coating, and thereby permit the use also of such types of plastics as have hitherto been considered unsuitable for the purpose.

These and other objects of the invention will become better apparent from the following description, taken in connection with the accompanying drawings in which:

FIG. 2 is a front view of the extrusion press, with part shown in section.

Figure 1:
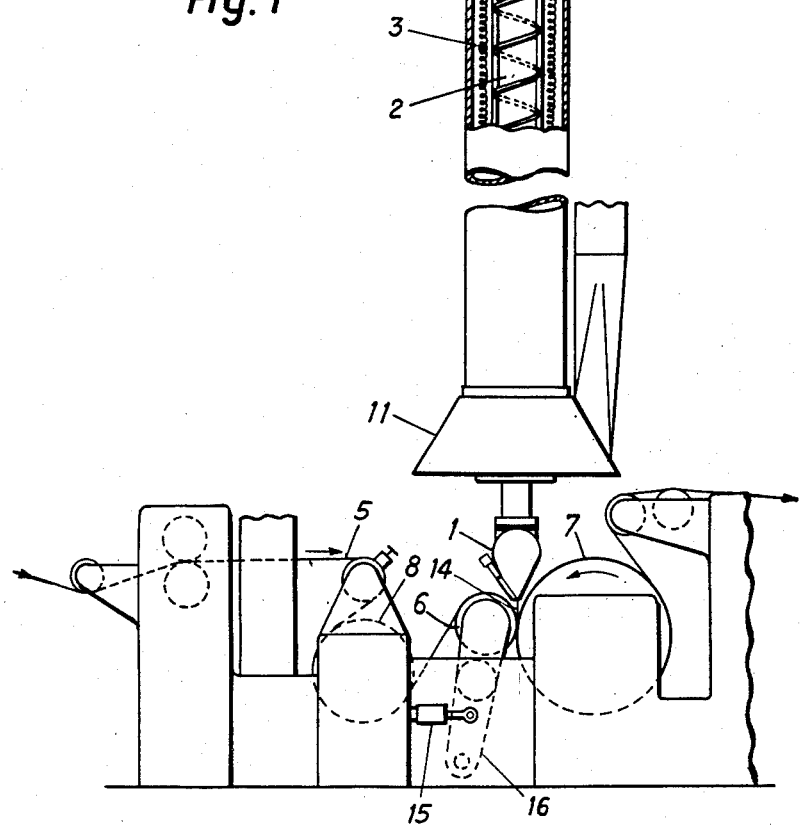
FIG. 1 is a side view of the device, with part cut away.

This device is intended to coat band-like material preferably a paper web with a plastic layer or film and permits sealing of heavy gage film as well as thin film at very high speed and forms a straight, continuous seal or coating. The device consists of two separate units, viz. the extruder and the roller frame. The extruder or extruding press consists substantially of the injection head 1 with a wide-slotted nozzle at its lower end, a rotatable feed screw 2 arranged above the injection head, an electrical heating system 3 with voltage control enveloping said feed screw, and a gear or drive box 4 containing the driving assemblies. The width of the nozzle of the injection head 1 is adjustable by means of an adjusting jaw, thus permitting the production of foils varying in thickness and having a width in the order of 3–4 ft. If narrower webs are to be coated, the working width of the nozzle can be reduced by means of inserts.

The feed screw 2 rotates about a vertical axis and the relation between length and the diameter is approximately 18:1. The feed screw is driven via a gearing preferably designed for variable-speed control. It is of course also conceivable to arrange the feed screw at a slight slant, if so required for special reasons. To permit easy access to the wide-slotted nozzle for cleaning, adjusting or checking purposes, the entire extruder is suspended from a trolley permitting the extruder to be run out cross wise of the running direction of the web. For this purpose, the top of the extruder is mounted on two wheel tracks, the design of the horizontally arranged bearers 9 resembling that of crane tracks. The wheels 10 can be driven by an electric motor 12 via conventional transmission means and, if necessary, speed-reducing means, thus permitting the extruder to travel sideways. It would of course be possible to use slideways instead of wheels for the travel of the extruder, whereby the travel could be effected by means of a threaded spindle, for instance.

The plastic raw material, by example polyethylene, is filled into a funnel-shaped hopper 13 at the top. This material is fed toward the injection head 1 by the rotation of the feed screw 2 and is heated by the electrical (or other) heating system 3. In the lower reaches of the extruder, the thermoplastic material assumes a moldable or pappy and finally liquid state owing to the increasing temperature, and is ultimately extruded through the wide-slotted nozzle or die of the injection head 1 in form of a hot thin filament or foil 14. The exhaust gas generated is sucked off through a flue 11 located immediately above the nozzle.

The roller frame located below the injection head is provided with several partly heatable pressing and guide rollers round which the band-like material 5 to be coated, is guided. The two pressing rollers 6 and 7 have unequal diameters and are pressed against each other with a line pressure of up to 190 lb./in. The nozzle of the injection head 1 is arranged closely above the line of contact of these rollers, and the nozzle slot extends parallel to the rotational axis of said rollers. To permit the injection head 1 with the wide-slotted nozzle at its lower end to be moved as near as possible to the pressing rollers, the bottom portion of the injection head is made V-shaped in section. The large pressing roller 7 is a steel roller plated with hard chromium and provided with a cooling system, while the small pressing roller 6 is preferably made of a rubber-resilient material. The pressure between the two pressing rollers 6 and 7 is variable and can be produced by a compressed-air cylinder 15, the pressing roller 6 being secured to a pivoted arm 16.

The action of the device is as follows:

The band-like material to be coated or sealed is unrolled from a stock roll not shown in the drawing. The associated unrolling device is preferably designed according to my U.S. Patent No. 3,071,333, issued on January 1, 1963. The band material 5 passes the heating cylinder roll 8, which heats said material, and passes thence between the pressing rollers 6 and 7, the advancing rate being infinitely adjustable up to about 450 feet per minute. During the travel of the material, a thin plastic film 14 having approximately the same width as the web of material comes out of the die.

Immediately after its discharge, this film, still hot and capable of adhesion, is pressed onto the web 5 by the two pressing rollers 6 and 7 and bonded to a unit under the pressure, without the addition of external adhesive agent. The web thus coated is then measured and trimmed at the edge, if required, and finally wound up on a stock roll or cut into sections.

It is also conceivable to coat materials other than paper in the manner described, such as metal foils, plastic materials or textile fabrics.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. Apparatus for forming a plastic band and comprising, in combination, a pair of cooperating pressure rollers having horizontal axes and cooperating with each other along a horizontal line of engagement to form a substantially V-shaped bight above said line between the surfaces thereof; means for supplying a web to said pressure rollers so that the web passes between said rollers and is transported by the same; supporting means located higher than said rollers and including horizontal rail means extending in axial direction of said rollers; and extrusion means including a vertical tube suspended from said supporting means and having at the lower end thereof an elongated nozzle extending in axial direction of said rollers, said extrusion means including a vertical screw located in said tube, and heating means in said tube for heating the extruded material before the same passes through said nozzle, said nozzle having in a vertical plane perpendicular to said axes of said rollers a substantially V-shaped outline, said extrusion means having an operative position in which said nozzle is located in said V-shaped bight, said nozzle having an axially extending outlet slot closely adjacent the web and said line of engagement of said rollers in said operative position of said extrusion means whereby band-shaped plastic extruded through said outlet slot directly passes between one of said rollers and the web to be bonded to the web without accumulation of plastic in said bight, said extrusion means having an upper portion movably mounted on said rail means of said supporting means for movement in axial direction of said rollers so that said nozzle can be moved horizontally in the longitudinal direction of said nozzle and parallel to the bight-forming surfaces of said rollers out of said bight from said operative position to an inoperative position located laterally of said rollers to permit access to said rollers and to said outlet slot when no plastic is extruded from said outlet slot.

2. Apparatus for forming a plastic band and comprising, in combination, a pair of cooperating pressure rollers having horizontal axes and cooperating with each other along a horizontal line of engagement to form a V-shaped bight between the surfaces thereof; supporting means located higher than said rollers; and extrusion means suspended from said supporting means and having at the lower end thereof an elongated nozzle extending in axial direction of said rollers, said extrusion means having an operative position in which said nozzle is located in said V-shaped bight, said nozzle having an axially extending outlet slot closely adjacent said line of engagement of said rollers in said operative position of said extrusion means whereby band-shaped plastic extruded through said outlet slot directly passes between said rollers without accumulation of plastic in said bight, said extrusion means having an upper portion movably mounted on said supporting means for movement in axial direction of said rollers so that said nozzle can be moved in the longitudinal direction of said nozzle and parallel to the bight-forming surfaces of said rollers out of said bight from said operative position to an inoperative position located laterally to said rollers to permit access to said rollers and to said outlet slot when no plastic is extruded from said outlet slot.

References Cited in the file of this patent
UNITED STATES PATENTS

| | | |
|---|---|---|
| 881,368 | Aucher | Mar. 10, 1908 |
| 2,316,202 | Warner | Apr. 13, 1943 |
| 2,590,186 | Land | Mar. 25, 1952 |
| 2,607,712 | Sturken | Aug. 19, 1952 |
| 2,609,320 | Modigliani | Sept. 2, 1952 |
| 2,627,085 | Rahm | Feb. 3, 1953 |
| 2,664,375 | Slayter | Dec. 29, 1953 |
| 2,690,206 | Mueller | Sept. 28, 1954 |
| 2,827,661 | Von Kohorn | Mar. 25, 1958 |
| 2,836,851 | Holt | June 3, 1958 |

FOREIGN PATENTS

| | | |
|---|---|---|
| 1,014,986 | France | June 25, 1952 |

OTHER REFERENCES

Ser. No. 153,704, Fields (A.P.C.), published Aug. 18, 1953.